(12) United States Patent
Hardin et al.

(10) Patent No.: US 6,675,121 B1
(45) Date of Patent: Jan. 6, 2004

(54) VELOCITY MEASURING SYSTEM

(75) Inventors: Larry C. Hardin, 960 Ocean Dr., Bandon, OR (US) 97411; Lawrence V. Nash, Gold Beach, OR (US)

(73) Assignee: Larry C. Hardin, Bandon, OR (US)

( * ) Notice: Subject to any disclaimer, the term of this patent is extended or adjusted under 35 U.S.C. 154(b) by 0 days.

(21) Appl. No.: 09/348,903

(22) Filed: Jul. 6, 1999

(51) Int. Cl.[7] .................... G01P 11/00; G06F 15/00
(52) U.S. Cl. ................ 702/142; 702/158; 356/4.01; 356/28; 382/106; 382/107
(58) Field of Search ............... 702/96, 127, 142, 702/143, 149, 159, 158; 356/3, 4.01, 27, 28; 382/106, 107; 324/160, 165; 340/936, 937, 942

(56) References Cited

U.S. PATENT DOCUMENTS

| | | | | |
|---|---|---|---|---|
| 3,245,307 A | * | 4/1966 | Lang | 356/619 |
| 3,804,517 A | * | 4/1974 | Meyr et al. | 356/28 |
| 4,580,894 A | * | 4/1986 | Wojcik | 356/28 |
| 5,586,063 A | * | 12/1996 | Hardin et al. | 324/160 |
| 5,642,299 A | * | 6/1997 | Hardin et al. | 702/142 |
| 5,734,337 A | * | 3/1998 | Kupersmit | 340/937 |
| 6,021,209 A | * | 2/2000 | Hirabayashi et al. | 382/103 |

FOREIGN PATENT DOCUMENTS

JP          2000346856 A    * 12/2000

* cited by examiner

Primary Examiner—Marc S. Hoff
Assistant Examiner—Manuel L Barbee
(74) Attorney, Agent, or Firm—Chernoff, Vilhauer, McClung & Stenzel

(57) ABSTRACT

A passive electro-optical range and total velocity measuring system having first and second cameras positioned along a common baseline. Control systems activate the first and second cameras at a first instance to capture a target image of a target at location $T_1$ and at a second instance to capture a target image of the target at location $T_2$. A range computer calculates ranges from the first camera, the second camera, and a baseline midpoint to a target at location $T_1$ and location $T_2$. An angles computer calculates target displacement. A velocity computer calculates total total target velocity, track velocity, and cross-track velocity. The present invention also includes a method for measuring the range and total velocity of a target using a passive electro-optical system.

4 Claims, 11 Drawing Sheets

VELOCITY MEASURING SYSTEM

BACKGROUND OF THE INVENTION

The following invention relates to a system for measuring the total velocity of a target, and more particularly relates to a passive electro-optical system for measuring two components of the total velocity: one parallel to the system line-of-sight and one perpendicular to the system line-of-sight.

Most speed detection systems require a transmitter to transmit energy towards a moving target that is reflected back to a receiver. Laser ranging systems measure the time of transmission and the return of the energy in order to calculate the range to the target and its speed. Radar ranging systems, such as the radar guns used by law enforcement agencies for traffic control, use the principle of Doppler frequency shift to calculate target speed. One problem with radar as a traffic control device is that target acquisition and measurement are ambiguous. Generally it can not be determined which target out of a multitude of possible targets is responsible for generating any particular speed indication. Another problem is that radar can be detected by receivers tuned to the proper frequency. Yet another problem with Doppler radars is that they cannot measure range. Available laser ranging systems can measure range, but are detectable by receivers (laser detectors), are more expensive than radar systems, and are more difficult to aim than radar systems.

U.S. Pat. No. 5,586,063 to Hardin et al., which is assigned to the assignee of this application and is incorporated herein by reference, is directed to a passive optical speed and distance measuring system (the '063 system). Specifically the '063 system includes a pair of camera lenses positioned along a common baseline a predetermined distance apart and controlled by an operator to capture images of a target at different times. The camera lenses are focused on light sensitive pixel arrays that capture target images at offset positions in the line scans of the pixel arrays. A video signal processor with a computer determines the location of the offset positions and calculates the range to the target by solving the trigonometry of the triangle formed by the two camera lenses and the target. Once the range to the target is known at two different times the speed of the target is calculated.

The '063 system measures only one component of velocity, the component in the direction of its line-of-sight. This component, in the general case, is less than the velocity of a target such as a moving object.

What is needed then is a system that is capable of measuring the total velocity of a target.

SUMMARY OF THE PRESENT INVENTION

The system of the present invention measures the total displacement of a target that is shown graphically as displacement vector $\delta_R$. The total velocity is then obtained by dividing by the time interval over which the displacement occurred. By comparison, the '063 system can measure only one component of this velocity (the component along the '063 system LOS). Further, the system of the present invention is able to resolve the displacement vector into two components; one component $X_R$ that is parallel to the system LOS and one component $X_R$ that is perpendicular to the system LOS. The corresponding x and y velocity components, $V_X$ and $V_Y$ respectively, are obtained by dividing by the time interval over which the displacement occurred.

Further, the system of the present invention may be used to track an object or to control a sensor platform to keep a system line-of-sight (LOS) pointed at a moving object because this system is capable of deriving the angle between the LOS of the system and the velocity vector of the moving target.

The present invention is directed to a passive electro-optical range and total velocity measuring system having first and second cameras positioned along a common baseline. A first camera control system activates the first camera at a first instance to capture a target image of a target at location $T_1$ and at a second instance to capture a target image of the target at location $T_2$. A second camera control system activates the second camera at the first instance to capture a target image of the target at location $T_1$ and at the second instance to capture a target image of the target at location $T_2$. A range computer calculates ranges from the first camera, the second camera, and a baseline midpoint to a target at location $T_1$ and location $T_2$. An angles computer calculates target displacement. A velocity computer calculates total target velocity, track velocity, and cross-track velocity, where track velocity and cross-track velocity are components of the total velocity.

A separate preferred embodiment of the present invention is directed to a method for measuring the range and total velocity of a target using a passive electro-optical system. Specifically, the method includes the steps of activating first and second image acquisition devices at a first instance to capture a target image of a target at location $T_1$ and at a second instance to capture a target image of the target at location $T_2$. The next steps are calculating steps in which the ranges from said first and second image acquisition devices to said target at locations $T_1$ and $T_2$, the target displacement $\delta_R$, the total target velocity V, the track velocity $V_X$, and the cross-track velocity $V_Y$ are calculated.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENT

Figure 1:
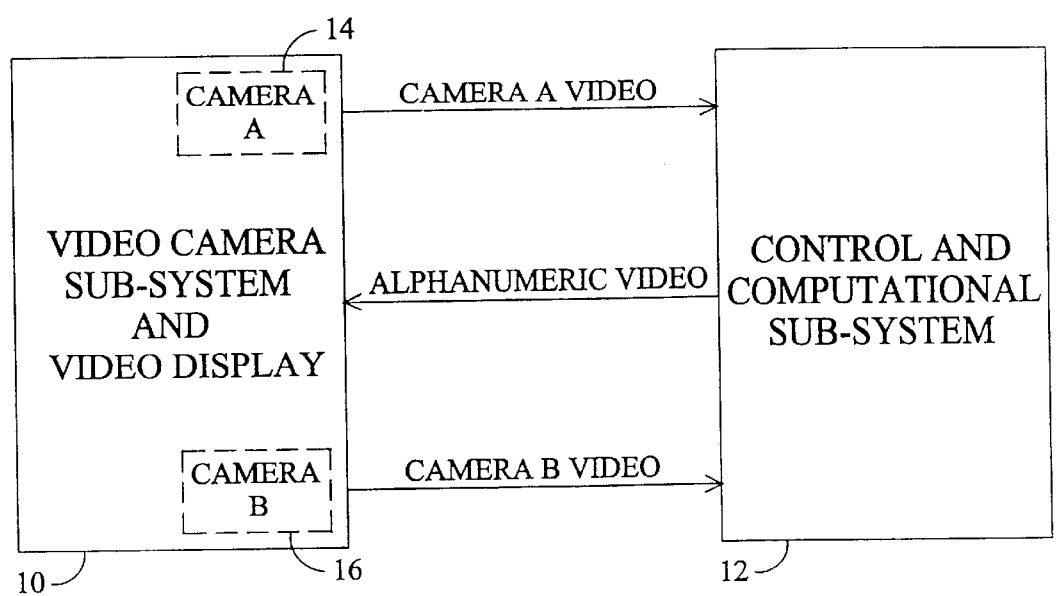
FIG. 1 is a simplified block schematic diagram of the system of the invention.

Referring to FIG. 1, the present invention includes a video camera subsystem and video display 10 connected to a control and computational subsystem 12. The camera subsystem 10 provides camera video from cameras A and B 14, 16 to the control and computational subsystem 12. The control subsystem supplies alphanumeric video to the video display subsystem 10. Cameras A and B 14, 16 may be any type of electro-optical imaging sensors with a focal length f. Each imaging sensor can be, for example, a charge-coupled device (CCD), a charge-injection device (CID), a metal-oxide-semiconductor (MOS) phototransistor array or various types of infra-red imaging sensors, one example of which is a Platinum Silicide (PtSi) detector array. Control and computational subsystem 12 may be any type of computer. For example, the computational subsystem 12 may be that shown in FIG. 11, a general purpose computer with special software, or an alternate computer specifically designed to accomplish the functions described herein.

Figure 2A:
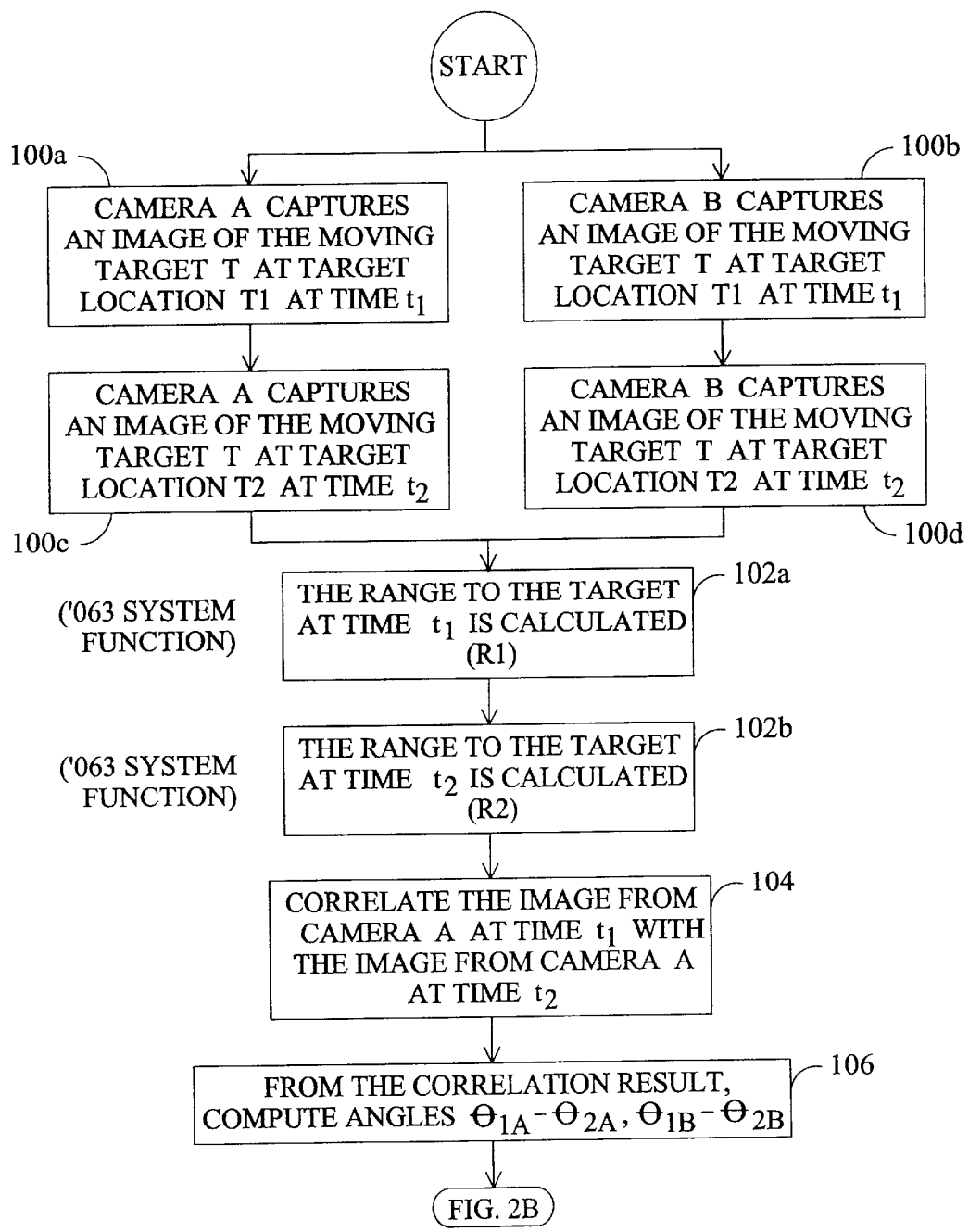
FIG. 2 is a simplified flow chart diagram of a preferred embodiment of the present invention.
Figure 2B:
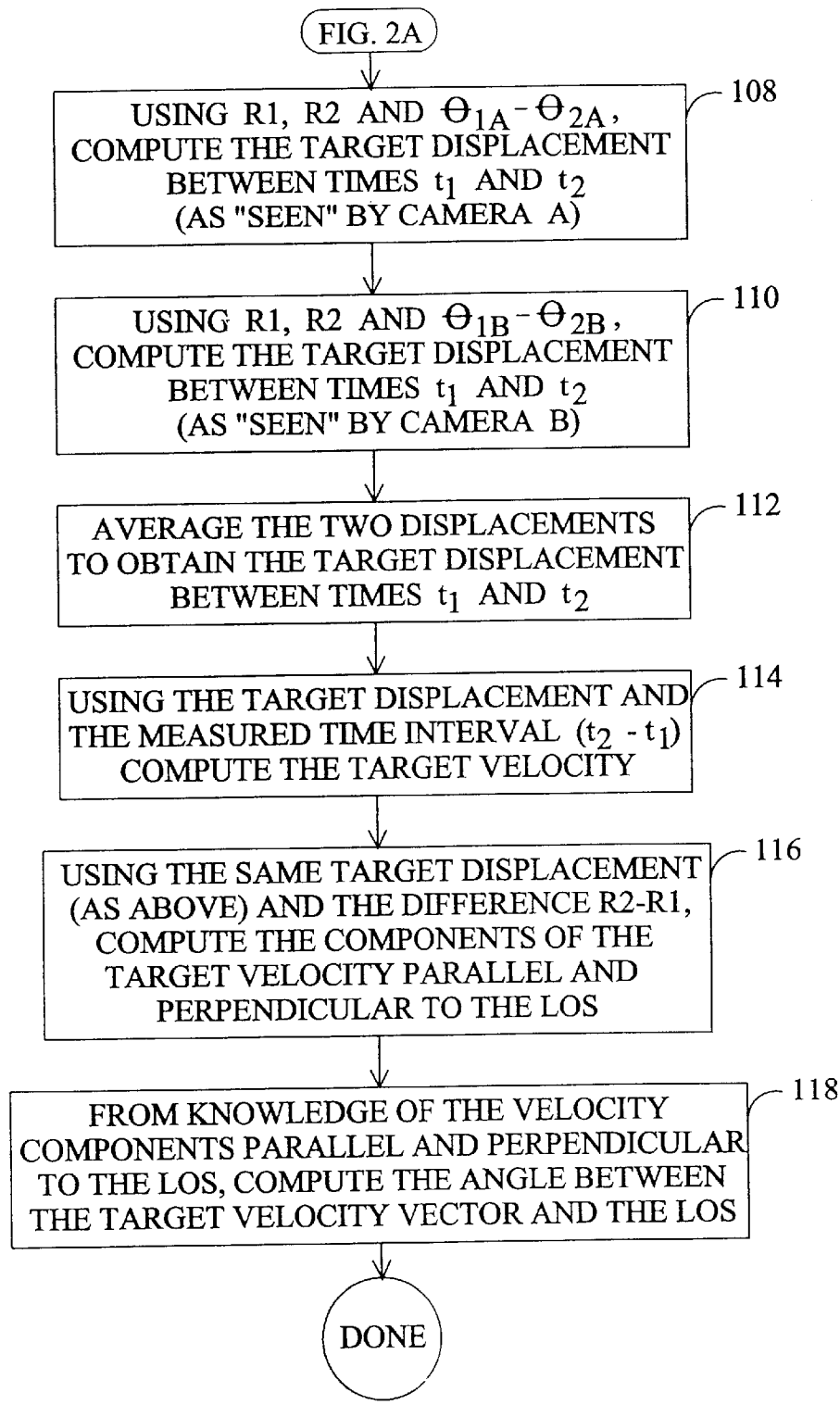

More specifically, as shown in FIG. 2, each of the cameras 14, 16 in the camera subsystem 10, when instructed by the control subsystem 12, take a video image or linear scan of moving target T at a first instance $t_1$ and at a second instance $t_2$ (for a total of four recorded images) 100a–100d. The target is at location $T_1$ at the first instance $t_1$ and at location $T_2$ at the second instance. The camera subsystem 10 then passes the camera video to the computational subsystem 12 that makes the calculations necessary to determine the range of the target T at time instance $t_1$ 102a and the range $R_2$ of the target T at time instance $t_2$ 102b. As will be discussed below in detail, the ranges $R_1$ and $R_2$ to target T at both time instances $t_1$ and $t_2$ are obtained by correlating the images obtained from both cameras at that time. The image from camera A at time $t_1$ is then correlated with the image from camera A at time $t_2$ 104. From the correlation result, the angles $\theta_{1A}-\theta_{2A}$ and $\theta_{1B}-\theta_{2B}$ can be calculated 106. Using $R_1$, $R_2$, and the angle $\theta_{1A}-\theta_{2A}$, the target displacement between times $t_1$ and $t_2$ as seen by camera A 108 can be calculated. Using $R_1$, $R_2$ and the angle $\theta_{1B}-\theta_{2B}$, the target displacement between times $t_1$ and $t_2$ as seen by camera B can be calculated 110. The two displacements are then averaged to obtain the target displacement between times $t_1$ and $t_2$ 112. Then, the total target velocity V is calculated using the target displacement and the measured time interval $(t_2-t_1)$ 114. Using the target displacement and the difference $R_1-R_2$, the components of the total target velocity parallel $V_X$ and perpendicular $V_Y$ to the line-of-sight can be computed 116. Finally, from the knowledge of the velocity components parallel and perpendicular to the line-of-sight, the angle between the total target velocity vector and the line-of-sight can be computed 118.

It should be noted that knowledge of the total target displacement $\delta_R$ and the time instance interval $(t_2-t_1)$ enables computation of the velocity of the target as well as the components $X_R$ and $Y_R$ of the displacement vector $\delta_R$. It should also be noted that the order of computations shown in FIG. 2 is meant to be exemplary and may be varied without changing the scope of the invention.

Figure 3:
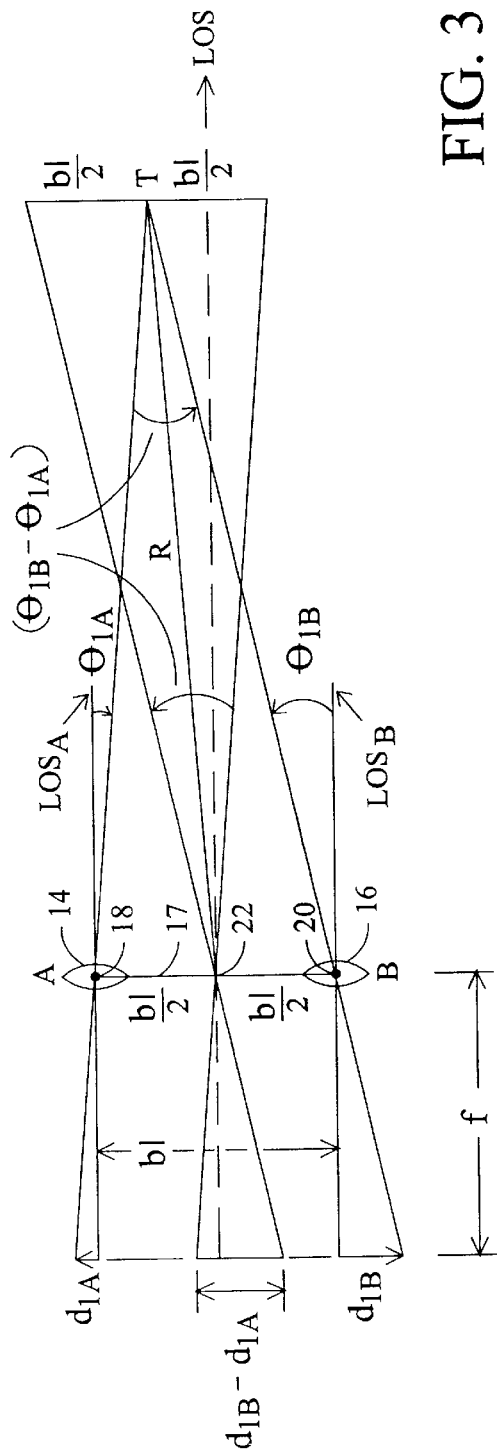
FIG. 3 is a schematic illustration of the electro-optical relationships of the system used for generating a range measurement.

Turning first to the exemplary computation of range R, FIG. 3 shows an optical schematic diagram illustrating the placement of cameras A and B 14, 16 used in the method for measuring of the range R or distance from the center of a baseline 17 to the target T. The method for measuring range R, the first step in the method of the present invention, is substantially the same method as that used in the '063 system. Calculating R would be done twice in the method of the present invention: once for calculating $R_1$ (the distance from the baseline midpoint 22 to the target at location $T_1$) and once for calculating $R_2$ (the distance from the baseline midpoint 22 to the target at location $T_2$). $R_1$ and $R_2$ will be used as approximations for $R_{1A}$, $R_{1B}$, $R_{2A}$, and $R_{2B}$ as set forth below.

Both the '063 system and the present invention, as shown in FIG. 3, include a camera A 14 positioned at a first position 18 and a camera B 16 positioned at a second position 20 on a baseline 17. In these positions, the cameras are separated by a distance of bl and have lines-of-sight LOS that are parallel and in the same plane. Range R, as measured by this method, is defined as the distance from the midpoint 22 of the baseline 17 to the exemplary target T. LOS is the line-of-sight of the two-sensor system. $LOS_A$ and $LOS_B$ are the lines-of-sight for cameras A and B 14, 16, respectively. LOS intersects baseline 17 at its midpoint 22, is in the same plane as the cameras' lines-of-sight, and is perpendicular to baseline 17. The angle shown as $\theta_{1A}$ is the angle between $LOS_A$ and the target T and the angle shown as $\theta_{1B}$ is the angle between $LOS_B$ and the target T. Using the image information supplied by the video camera sub-system 10, the control and computational sub-system 12 first determines the angle of interest $(\theta_{1B}-\theta_{1A})$ by electronically correlating the images from the focal planes of cameras A and B 14, 16 to measure the linear displacement $d_{1B}-d_{1A}$. The magnitude of $d_{1B}-d_{1A}$ can be measured by correlating the A and B camera images obtained at time $t_1$. $d_{1B}-d_{1A}$ is measured at the focal plane which is behind the baseline by a distance f, the focal length.

Figure 4:
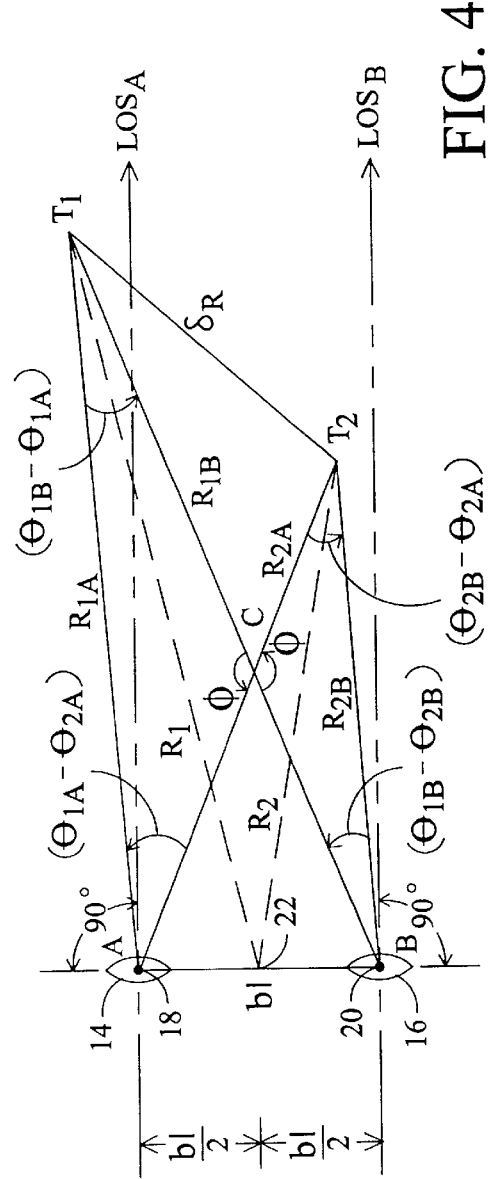
FIG. 4 is a schematic illustration of the electro-optical relationships of the system used for generating a velocity measurement.

Image correlation is possible in the present invention because the system geometry (as shown in FIGS. 3 and 4) is such that a portion of the image from camera A 14 will contain information very similar to that contained in a portion of the image from camera B 16 when both images are acquired at the same time. This common information occurs in a different location in the camera A image when compared to its location in the camera B image due to the separation of the two cameras by the baseline distance bl.

Figure 5:
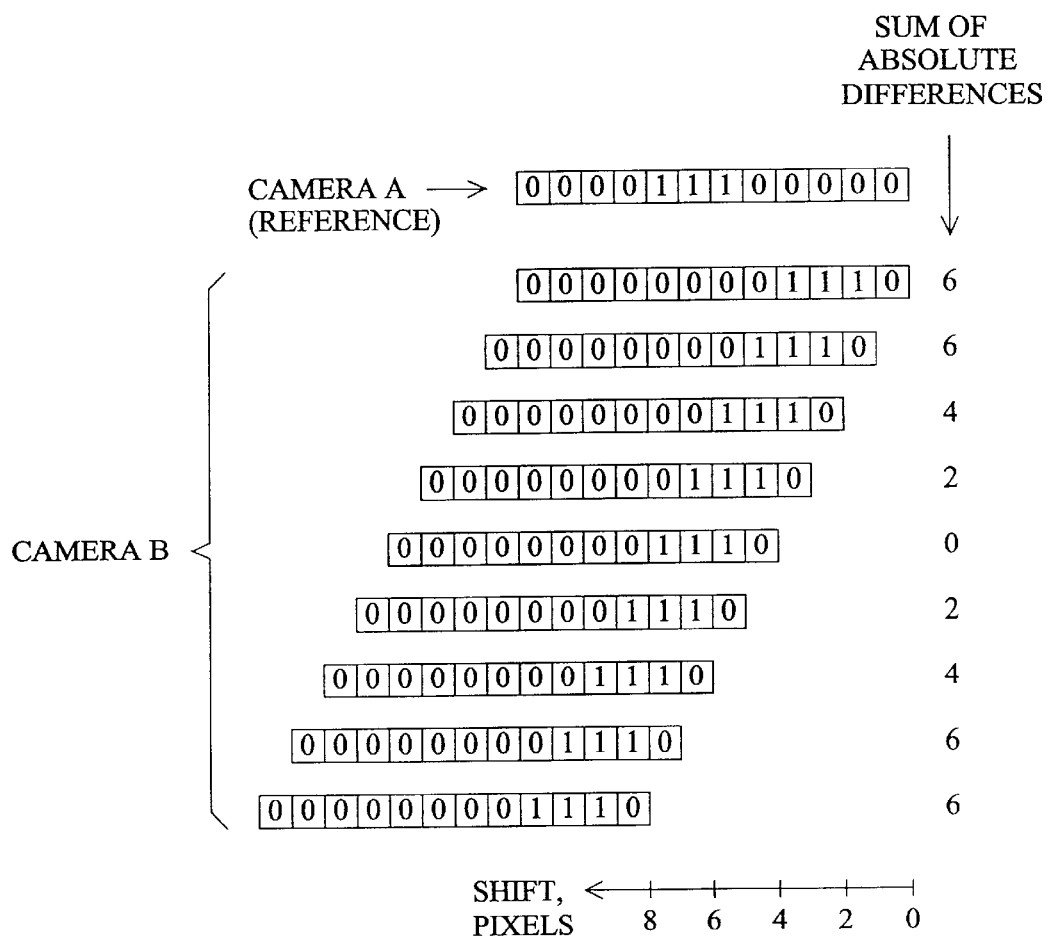
FIG. 5 is a schematic illustration of a simplified hypothetical example of the correlation process.
Figure 6:
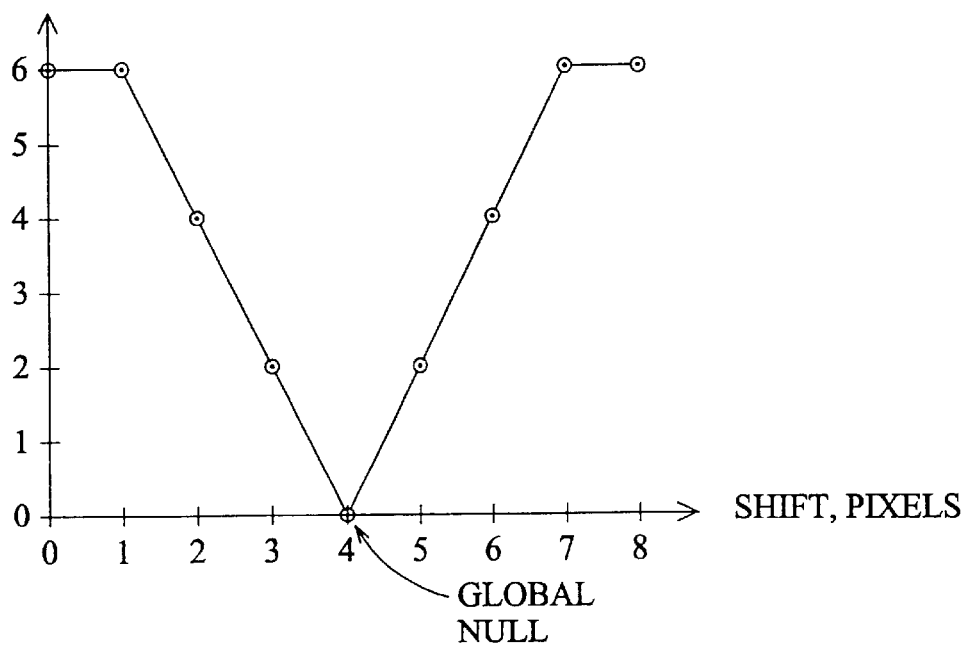
FIG. 6 is a null curve diagram illustrating an exemplary relationship between the shift in pixels (x-axis) and the sum of the absolute differences (y-axis).

The correlation process is discussed in U.S. Pat. No. 5,586,063 to Hardin et al., which is assigned to the assignee of this application and is incorporated herein by reference. However, FIGS. 3 and 4 may be used to illustrate this process. FIG. 5 illustrates the correlation of two linear images, one from Camera A, the other from Camera B. For simplicity, a hypothetical video line of 12 pixels is shown. (In practice, cameras with video line-lengths of hundreds of pixels are used.) In addition, for simplicity of illustration, a single 3 pixel-wide image of unit (I) intensity is shown, with a uniform background of zero intensity. In practice, any pixel can have any value within the dynamic range of the camera. The pixel values for each of the two video lines are mapped in computer memory. In this case, the Camera A line is used as the reference. The map for the Camera B line is then matched with the A line map at different offsets from zero pixels to some maximum value dictated by other system parameters. (Zero pixels offset corresponds to a range of infinity.) This unidirectional process is sufficient since the relative position of any target in the FOV of one camera with respect to the other is known. At each offset position the absolute difference is computed for each adjacent pixel-pair that exists (the pixels in the overlap region). The differences are then summed. It should be noted that there are a number of other mathematical procedures that could be used to correlate the lines that would achieve similar results. One advantage of the procedure described is that no multiplication (or division) operations are required. (Addition and subtraction are computationally less intensive.) FIG. 6 is a plot of the sum of absolute differences (y-axis) versus the offset for this example. Note that the function has a minimum at the point of best correlation. This is referred to as the "global null," "global" differentiating it from other shallower nulls that can result in practice. The offset value corresponding to the global null is shown in FIG. 6 as $d_{1B}-d_{1A}$. This quantity is also shown in FIG. 3.

In order to measure the total displacement of the target (in order to compute the total velocity) at least one more correlation is required. The additional correlation is performed in a similar manner to that described above, but is a temporal correlation. It uses images from the same camera (Camera A), obtained at two different times (t1 and t2). One difference is that the relative positions of the target image at the two different times is not known to the System. This requires that the correlation be bi-directional. Bi-directional correlation is achieved by first using the t1 image map as the reference and shifting the t2 image map, then swapping the image maps and repeating the process.

Once image correlation has been completed, the angle $(\theta_{1B}-\theta_{1A})$ can be found from the equation: $\theta_{1B}-\theta_{1A}=$arctan $[(d_{1B}-d_{1A})/f]$. Using this information, range R is calculated by the equation: $R=bl/[2 \tan \frac{1}{2} (\theta_{1B}-\theta_{1A})]$. Alternatively, the computational sub-system 12 can find range R by solving the proportionality equation: $(d_{1B}-d_{1A})/f=(bl/2)/R$. The method for finding R is set forth in more complete terms in U.S. Pat. No. 5,586,063, however, alternative methods for computing range may be used.

FIG. 4 is an optical schematic diagram of the placement of cameras A and B 14, 16 as well as the angles and distances used in the method for measuring of the velocity v, the second step in the method of the present invention. To make the necessary calculations to find the velocity v, first the target displacement $(\delta_R)$ between the target location $(T_1)$ at a first instance $(t_1)$ and the target location $(T_2)$ at a second instance $(t_2)$ must be determined. Once $\delta_R$ is determined, the velocity (v) is computed as: $v=\delta_R/(t_2-t_1)$. It should be noted that the '063 system can compute only the ranges $R_1$ and $R_2$ which, when differenced (to form $R_2-R_1$), constitute only one component of the total displacement $\delta_R$.

To find an accurate $\delta_R$, both triangle A (defined by camera A lens 14 at position 18 on the baseline 17, the target location $T_1$ at the first instance $t_1$, and the target location $T_2$ at the second instance $t_2$) and triangle B (defined by camera B lens 16 at position 20 on the baseline 17, the target location $T_1$ at the first instance $t_1$, and the target location $T_2$ at the second instance $t_2$) should be solved. By solving triangle A to find $\delta_{RA}$, an approximate of $\delta_R$ is found. Solving for $\delta_{RB}$ and averaging it with $\delta_{RA}$ ($\delta_R=(\delta_{RA}+\delta_{RB})/2$) greatly reduces error in using a single calculation. It should be noted that images of the target acquired by cameras A and B at times $t_1$ and $t_2$ may have already been acquired and stored for use in range computations of the '063 system.

Figure 7:
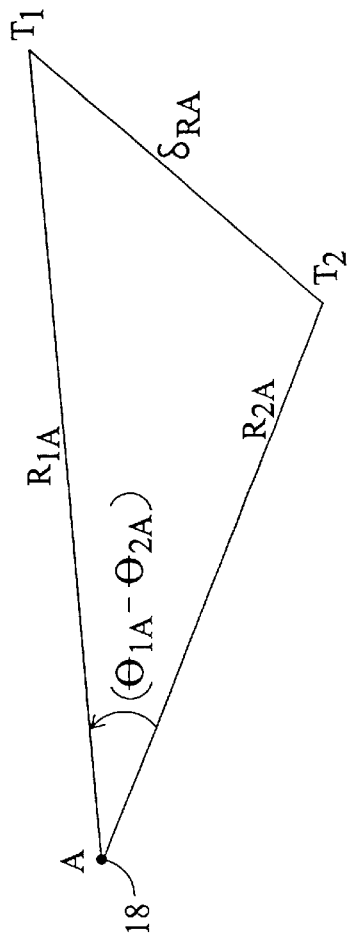
FIG. 7 is a simplified schematic illustration depicting the angular relationships between camera A and the target T at times $t_1$ and $t_2$.

FIG. 7 shows an enhanced view of triangle A (defined by camera A lens 14 at position 18 on the baseline 17, the target location $T_1$ at the first instance $t_1$, and the target location $T_2$ at the second instance $t_2$). Specifically, the angle $\theta_{1A}-\theta_{2A}$ is the angular difference between target locations $T_1$ and $T_2$, as measured by camera A. The images are acquired by camera A at times $t_1$ and $t_2$, as set forth above, and are then correlated to obtain the angle $\theta_{1A}-\theta_{2A}$. The next step is to use $R_1$ and $R_2$ as approximations for $R_{1A}$ and $R_{2A}$ respectively. $R_1$ and $R_2$ can be calculated using the equations set forth generally above and in detail in U.S. Pat. No. 5,586,063, incorporated herein by reference. Using these calculations, triangle A can be solved for the displacement $\delta_{RA}$, using the law of cosines: $\delta_{RA}=[R_1^2+R_2^2-2R_1R_2 \cos(\theta_{1A}-\theta_{2A})]^{1/2}$.

Figure 8:
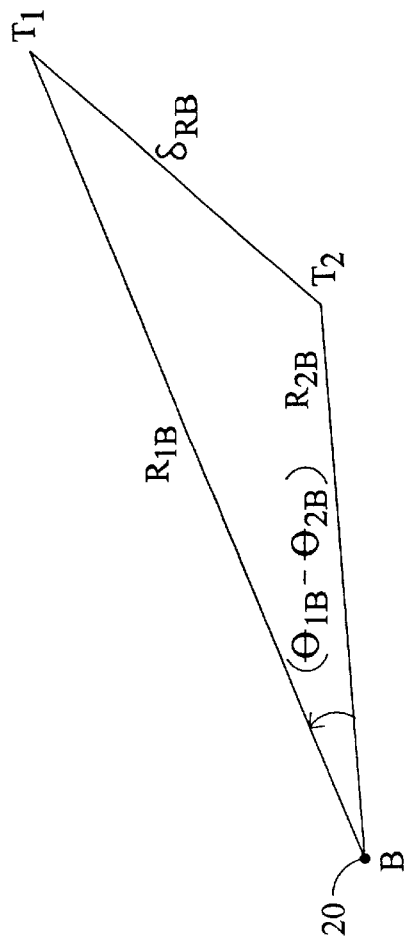
FIG. 8 is a simplified schematic illustration depicting the angular relationships between camera B and the target T at times $t_1$ and $t_2$.

$\delta_{RA}$ is slightly different than the desired $\delta_R$ (of FIG. 4) because $R_1$ and $R_2$ are distances from the midpoint 22 of the baseline to target locations $T_1$ and $T_2$, whereas $R_{1A}$ and $R_{2A}$ are distances from camera A to target locations $T_1$ and $T_2$. Using the built in symmetry of the system, this error can be greatly reduced by solving triangle B (defined by camera B lens 16 at position 20 on the baseline, the target location $T_1$ at the first instance $t_1$, and the target location $T_2$ at the second instance $t_2$) of FIG. 8 for $\delta_{RB}$ and averaging the two results. $\delta_{RB}$ may be found using calculations similar to those set forth above for triangle A. Specifically, triangle B can be solved for the displacement $\delta_{RB}$, using the law of cosines: $\delta_{RB}=[R_1^2+R_2^2-2R_1R_2 \cos(\theta_{1B}-\theta_{2B})]^{1/2}$.

It should be noted that the solution of triangle B does not require a correlation operation (as did the solution of triangle A) to determine the angle $\theta_{1B}-\theta_{2B}$. The reason for this can be seen by referring to FIG. 4 where it can be seen that the triangles A, C, $T_1$ and B, C, $T_2$ both contain the same angle $\phi$ (from the law that opposite angles are equal). C is the point of intersection between $R_{1B}$, the range from camera B to the target at the first instance, and $R_{2A}$, the range from camera A to the target at the second instance.) Thus, since three of the four difference angles shown are known, the fourth can be computed using the law that the sum of the interior angles of a triangle is always equal to 180 degrees. Correlation using the images from camera B 16 may be performed for the optional purpose of verifying optical alignment.

As set forth above, once $\delta_R$ is determined, the velocity v of target T is computed as: $v=\delta_R/(t_2-t_1)$. The time base 12a and sync generator 12b (FIG. 11) would provide the elements necessary to compute $t_1$ and $t_2$.

The next step of the present invention is to compute the parallel component $X_R$ of the displacement vector $\delta_R$ and the perpendicular component $Y_R$ of the displacement vector $\delta_R$. Component $X_R$ of the displacement vector is parallel to the LOS in the plane defined by the LOS and the baseline 17. Component $Y_R$ of the displacement vector is perpendicular to the LOS in the plane defined by the LOS and the baseline 17. The velocity vector components are determined by dividing the displacement vector component values by the time interval over which the displacement occurred.

Figure 9:
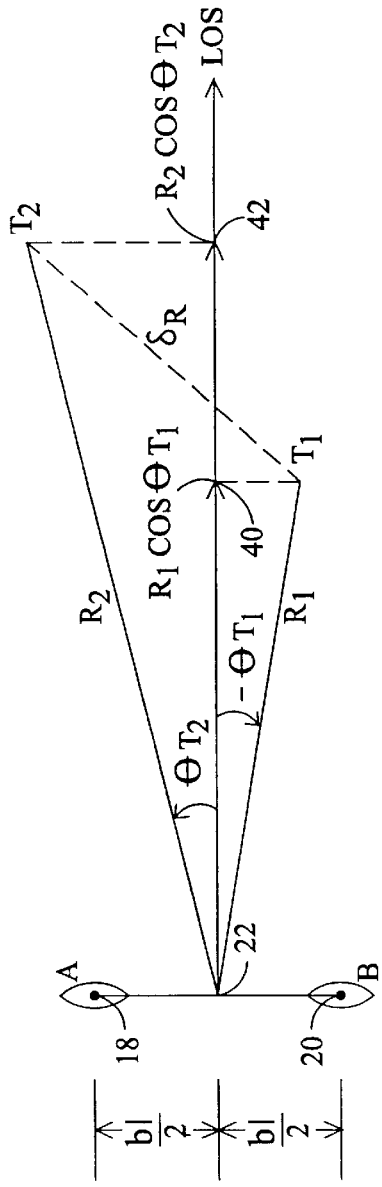
FIG. 9 is a schematic illustration depicting the angular relationships used for generating velocity vector components and approximations.
Figure 10:
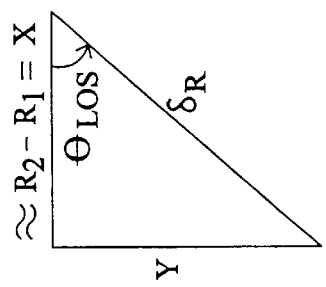
FIG. 10 is a simplified schematic illustration depicting the angular relationships used for generating velocity vector components and approximations.

As shown in FIGS. 9 and 10, the x component parallel to the LOS, $X_R$, is defined as the difference of the two range measurements $R_1$ (the distance between the baseline midpoint 22 and the target $T_1$ at first instance $t_1$) and $R_2$ (the distance between the baseline midpoint 22 and the target $T_2$ at second instance $t_2$). The difference between the two range measurements can be approximately defined by the equation: $X_R=R_2-R_1$. This is an approximation, since the actual difference of the two range measurements is defined by the equation: $R_2 \cos \theta T_2 - R_1 \cos \theta T_1$. $R_1 \cos \theta T_1$ is the distance on the LOS from the baseline midpoint 22 to point 40, the perpendicular distance from $T_1$ to the LOS. $R_2 \cos \theta T_2$ is the distance on the LOS from the baseline midpoint 22 to point 42, the perpendicular distance from $T_2$ to the LOS. However, $\theta T_2$ (the angle between LOS and $R_2$) and $\theta T_1$ (the angle between LOS and $R_1$) cannot be determined. The $X_R = R_2 - R_1$ approximation will produce accurate results when $\theta T_1$ and $\theta T_2$ are both small. $V_X$, the x component of the velocity vector, is then determined as $V_X = X_R/(t_1 - t_2)$.

The y component of the velocity vector, $Y_R$, also known as a "cross-track" velocity component, is then solved using the relationship set forth in FIG. 10. Using $\delta_R$ (as computed above) as the hypotenuse and $X_R$ (as computed above) as one leg of the relationship triangle of FIG. 10, the triangle shown in FIG. 10 can be solved for the perpendicular displacement component $Y_R$ using Pythagorean theorem: $Y_R = [(\delta_R)^2 - X_R^2]^{1/2}$. The y component of the velocity, $V_Y$, is then $V_Y = Y_R/t_2 - t_1$. The angle between the velocity vector and the LOS can then be calculated by the following equation: $\theta_{LOS} = \arctan Y_R/X_R$. Knowledge of the angle $\theta_{LOS}$ is of value in applications where it is desirable to move the system line-of-sight to track the target or simply to keep the target in the field of view.

Figure 11:
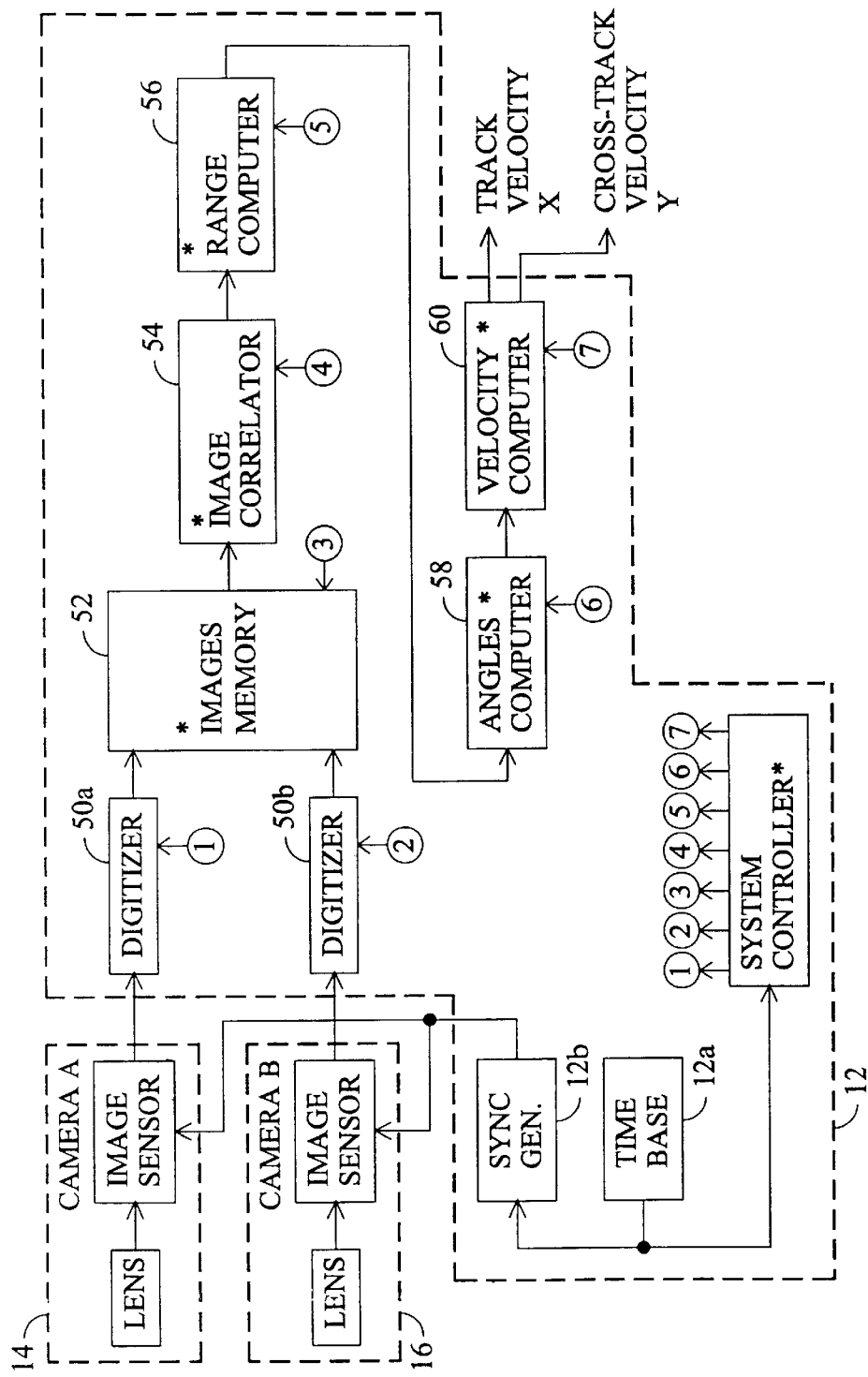
FIG. 11 is a simplified block schematic diagram of the system of the invention.

FIG. 11 shows an exemplary functional block diagram of one possible implementation of the velocity measuring system of the present invention. Camera or sensor A 14 and camera or sensor B 16 are electronic imaging cameras substantially controlled by the system controller 12. The time base 12a and sync generator 12b are used to synchronize the cameras. Further, the time base 12a provides the time interval measurement capability that allows calculation of $t_1$ and $t_2$. The time between image acquisitions may be determined by keeping count of the number of camera images that have been scanned between image acquisitions.

The digitizers 50a, 50b convert the analog camera outputs to a digital format, enabling the camera images (or portions thereof) to be stored in conventional computer-type memory 52.

The image correlator 54 correlates the images supplied by camera A 14 and camera B 16. The correlation process is used to determine the angular difference between cameras when sighting an object or target T at the same time ("correlation") or at two different times ("cross-correlation").

The range computer 56 then determines the range R to the target T by triangulation using the measured angular difference acquired by the cameras at the same time.

The angles computer 58 uses both the range and angle measurements to compute the components of displacement of the target T parallel and perpendicular to the system LOS.

The velocity computer 60 uses the measured displacement components and knowledge of the time between measurements $(t_2 - t_1)$ to compute velocity V and its components, $V_X$ and $V_Y$.

The system controller 12 sequences and manages measurement and computation. The image correlator 54, range computer 56, angles computer 58, velocity computer 60, and system controller 12 can be implemented as hard-wired electronic circuits, or these functions can be performed by a general-purposed digital computer with special software.

Although the invention has been described with reference to detection systems for detecting the range and total velocity of a general moving target it should be understood that the invention described herein has much broader application, and in fact may be used to detect the range to a stationary object, the total velocity of any moving object and/or relative motion between moving or stationary objects. For example, the invention may be incorporated into a range and velocity detection system for moving vehicles. Another example is that the invention may be incorporated in a robotics manufacturing or monitoring system for monitoring or operating upon objects moving along an assembly line. Still another important application is a ranging device used in conjunction with a weapons system for acquiring and tracking a target. Yet another application is a spotting system used to detect camouflaged objects that may be in motion against a static background. Other possible uses and applications will be apparent to those skilled in the art.

Figure 12:
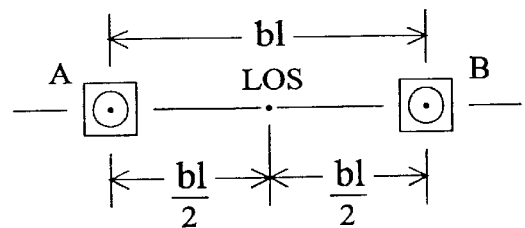
FIG. 12 is a simplified schematic illustration of a two-camera system of the present invention.
Figure 13:
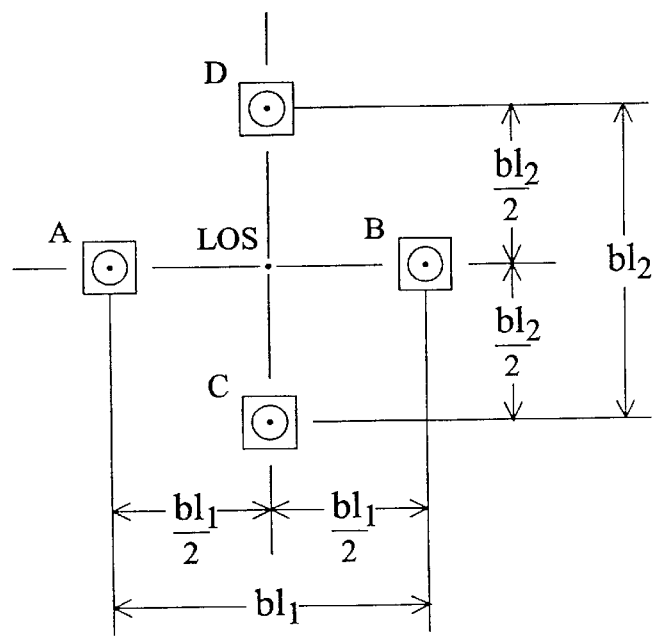
FIG. 13 is a simplified schematic illustration of a four-camera system of the present invention.
Figure 14:
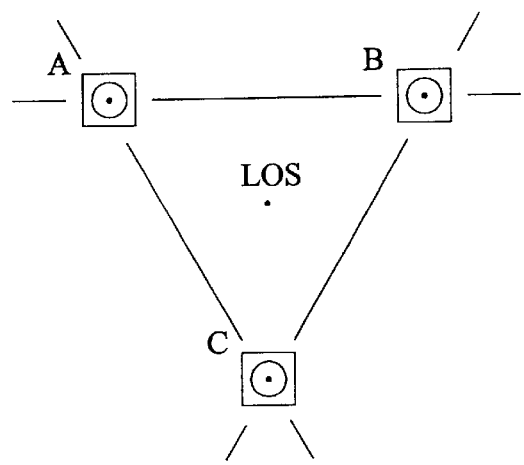
FIG. 14 is a simplified schematic illustration of a three-camera system of the present invention.
Figure 15:
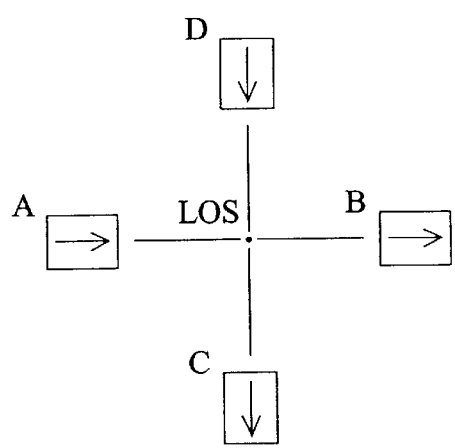
FIG. 15 is a depiction of the video scan lines orientation of the four-camera system of FIG. 13.

The foregoing invention can also be adapted to measure velocity in three-dimensional space. To do this a two-dimensional camera configuration, such as that shown in FIG. 12, is adapted to either the configuration shown in FIG. 13 or FIG. 14. The embodiment shown in FIG. 13 uses four cameras, A, B, C, and D centered around a central LOS (extending outward form the page). The baseline $bl_1$ defined between cameras A and B is perpendicular to baseline $bl_2$ defined between cameras C and D, although $bl_1$ and $bl_2$ need not be the same length. FIG. 15 shows the video scan lines orientation for this system$_a$ in which cameras A and B operate as one subsystem and cameras C and D operate as a second subsystem that is a duplicate of the camera A and B subsystem, except for its orientation. The velocity vectors produced by the two subsystems are summed (vector summation) to yield the total target velocity in three dimensions. FIG. 14 shows an alternate configuration that can measure velocity in three-dimensions, but uses only three cameras A, B, and C. It should be noted that the FOV is smaller than that of the four camera system of FIG. 13 and the calculations to determine the velocity are more complex.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A method for measuring the range and total velocity of a target using a passive electro-optical system oriented along a line of sight (LOS) axis, said system including first and second image acquisition devices positioned along a common baseline perpendicular to said LOS, said method comprising the steps of:

(a) activating said first image acquisition device at a first instance $t_1$ to capture a target image of a target at location $T_1$ and at a second instance $t_2$ to capture a target image of said target at location $T_2$;

(b) activating said second image acquisition device at said first instance $t_1$ to capture a target image of said target at location $T_1$ and at said second instance $t_2$ to capture a target image of said target at location $T_2$;

(c) calculating ranges from said first image acquisition device to said target at location $T_1$ and location $T_2$;

(d) calculating ranges from said second image acquisition device to said target at location $T_1$ and location $T_2$;

(e) calculating a target displacement vector $\delta_R$ by performing the following steps:

(i) defining a triangle A between said first image acquisition device, $T_1$, and $T_2$;
(ii) defining a triangle B between said second image acquisition device, $T_1$ and $T_2$;
(iii) solving triangle A to find $\delta_{RA}$, a first approximate distance between $T_1$ and $T_2$;
(iv) solving triangle B to find $\delta_{RB}$, a second approximate distance between $T_1$ and $T_2$; and
(v) averaging $\delta_{RA}$ and $\delta_{RB}$ to find a substantially accurate $\delta_R$ using the formula: $\delta_R=(\delta_{RA}+\delta_{RB})/2$; and (f) calculating total target velocity V.

2. The method of claim 1, further comprising the step of calculating velocity components parallel to and perpendicular to the LOS, respectively.

3. The method of claim 1, further comprising the step of implementing steps (a)–(f) using at least one software program implemented by at least one computer.

4. The method of claim 1 wherein said step of calculating total target velocity V includes the step of solving the equation: $V=\delta_R/(t_2-t_1)$.

* * * * *